United States Patent [19]

Brumleu, Jr.

[11] 4,159,674

[45] Jul. 3, 1979

[54] UNIVERSAL DIFFUSER ASSEMBLY AND METHOD OF MANUFACTURING

[76] Inventor: Edward C. Brumleu, Jr., 18612 Marapose Dr., Villa Park, Calif. 92667

[21] Appl. No.: 791,064

[22] Filed: Apr. 26, 1977

[51] Int. Cl.² ............................ F24F 7/00; B32B 5/14
[52] U.S. Cl. ............................ 98/40 R; 98/DIG. 10; 428/170; 428/171; 428/218; 428/167
[58] Field of Search ........ 98/40 D, 40 VM, DIG. 10, 98/40 R; 181/205, 224; 428/170, 171, 218, 167

[56] References Cited

U.S. PATENT DOCUMENTS

| | | | |
|---|---|---|---|
| 2,439,137 | 4/1948 | Keller | 428/171 |
| 2,692,219 | 10/1954 | Slayter et al. | 428/218 X |
| 2,987,258 | 6/1961 | North | 237/53 |
| 3,012,493 | 12/1961 | Ekeren | 98/40 D |
| 3,225,677 | 12/1965 | Steele | 98/94 |
| 3,507,354 | 4/1970 | Dieckmann et al. | 98/40 D |
| 3,559,560 | 2/1971 | Trahan | 98/40 D |
| 3,688,867 | 9/1972 | Antonetti et al. | 415/119 X |
| 4,050,364 | 9/1977 | Maus | 98/94 R X |

FOREIGN PATENT DOCUMENTS 6707584  12/1967  Netherlands ............................ 428/218

Primary Examiner—George F. Lesmes
Assistant Examiner—Alexander S. Thomas
Attorney, Agent, or Firm—Harold L. Jackson; Stanley R. Jones; Joseph W. Price

[57] ABSTRACT

An improved lightweight diffuser assembly having a plenum chamber formed of fiberglass laminae is provided. The diffuser assembly is universally adapted for interfacing with various size conventional ducts of an air delivery system. The plenum chamber has a variable density across its surface and further includes a fibrous textured interior surface to optimize the sound absorption characteristics. Sheets of laminae fiberglass impregnated with uncured phenolic binders are placed in an appropriate die mold cavity and subjected to both compression and heat. The plenum chamber is cured in approximately a temperature of 700° F. to 900° F. for a time period of approximately 25 to 45 seconds to provide an interior fibrous textured surface. Carbon black and an interior sealing sheet can be introduced into the fiberglass laminae prior to compression.

25 Claims, 5 Drawing Figures

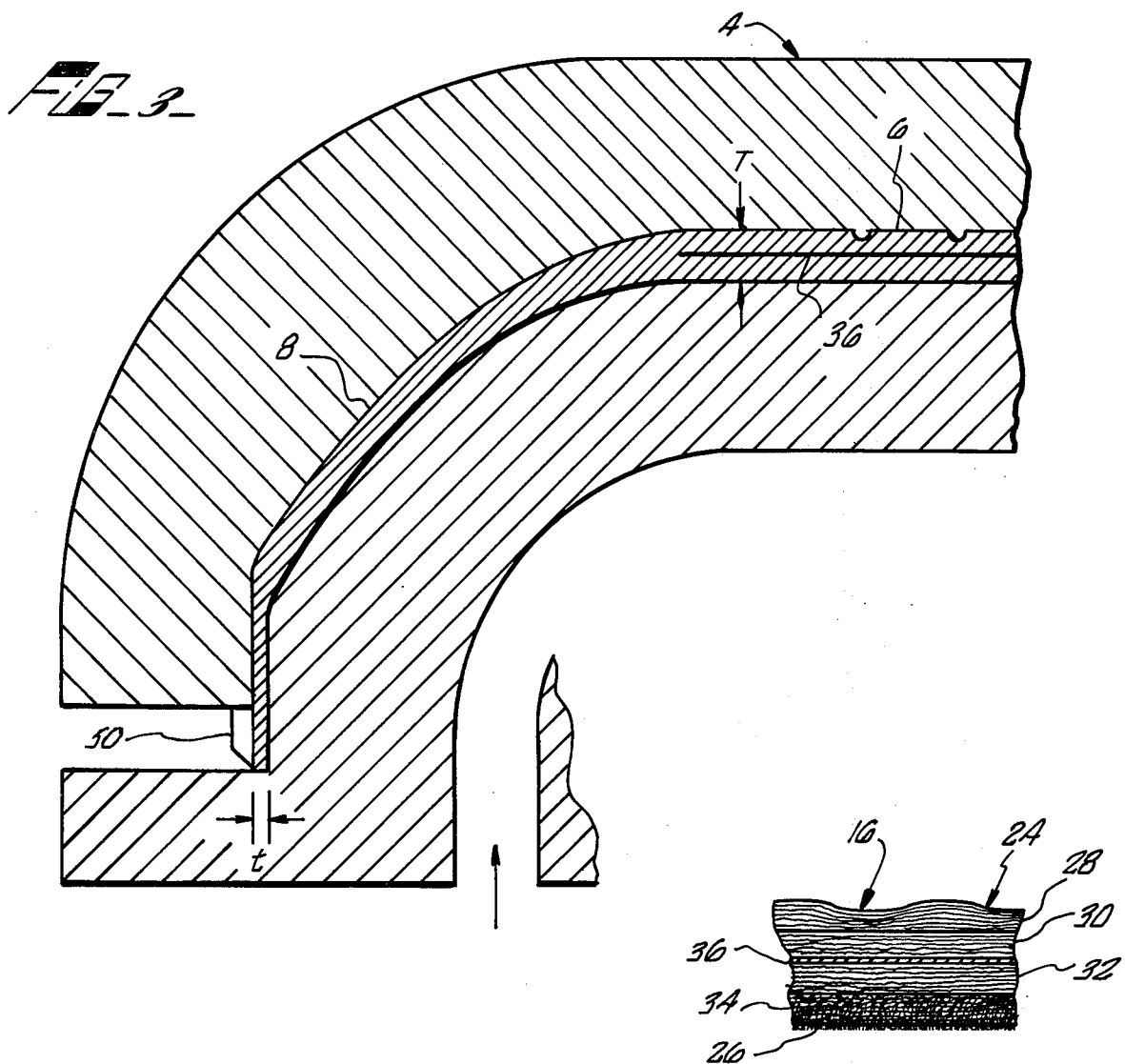
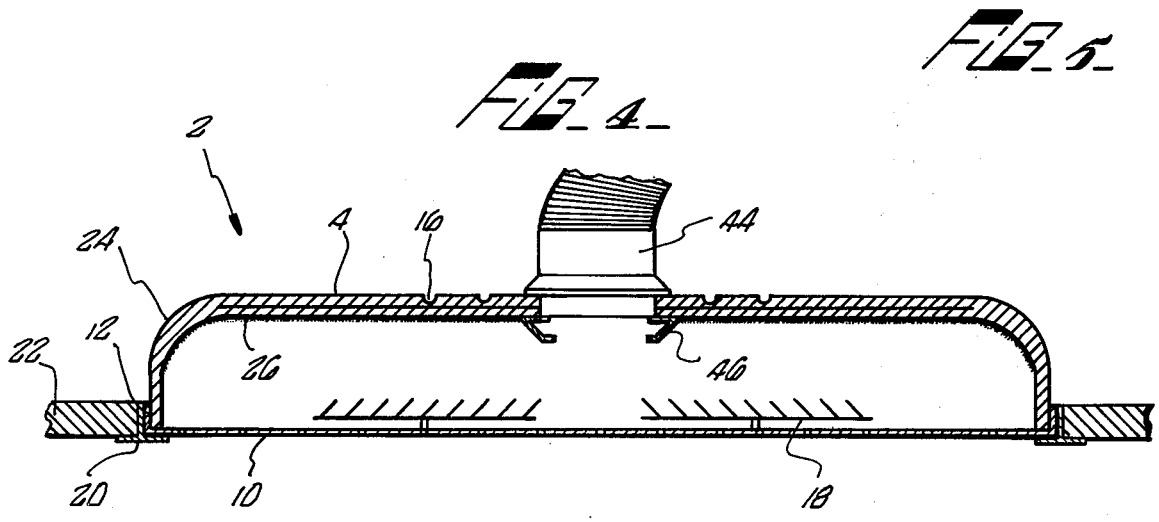

UNIVERSAL DIFFUSER ASSEMBLY AND METHOD OF MANUFACTURING

BACKGROUND OF THE INVENTION

1. Field of the Invention

The present invention is directed to a diffuser assembly for connection to heat and air-conditioning systems and more particularly to a universal diffuser assembly that is lightweight, with improved thermal insulating and sound absorbing characteristics and a method of manufacturing the same.

2. Description of the Prior Art

Air diffuser assemblies of various configurations and material have been suggested in the prior art. Since air-conditioning and heating design, in both commercial and residential buildings, requires a subjective determination of diffuser sizes and locations, a distributor generally must maintain a supply of different size plenum chambers and adaptor collars to meet subjective design requirements.

The most popular diffuser assemblies utilized are formed from sheet metal in a relatively simplified box construction to insure maximum economy in labor and cost of materials. These metal plenum chambers can be relatively noisy and have poor thermal insulating characteristics. Frequently a manufacturer will seek to standardize a plenum chamber and provide different size adapter collars for interfacing with various size air-conditioned ducts, this approach, however requires an additional part, viz, a transition adaptor collar. There have been suggestions in the prior art to both thermally insulate and reduce vibratory sound by treating the plenum chamber with insulating material as disclosed in U.S. Pat. No. 3,225,677.

U.S. Pat. No. 2,987,258 discloses a sheet metal plenum chamber having appropriately shaped wall sections that are partially cut through to form both duct outlets when removed and to provide an adjustable damper for the duct outlet.

Finally, U.S. Pat. No. 3,688,867 discloses an acoustical blower package for a computer wherein a block of sound absorbing material is mounted within a housing shell and is coated with neoprene in an attempt to muffle both the motor and scroll chambers.

To date, the building industry has had to resort to box shaped metal plenum chambers with transition adaptor collars when installing heating and air-conditioning systems in buildings. There is a need for an improved and more economical, lightweight diffuser assembly having a reduced noise criteria, NC, level over that of the conventional metal diffuser assemblies.

SUMMARY OF THE INVENTION

An improved diffuser assembly capable of universal connection to heating and air-conditioning systems is provided. A perforated faceplate can be connected to a fiberglass plenum chamber. The means for controlling the directional flow pattern of the air through the faceplate can be included. The plenum chamber includes a connector member and a wall defining the concave periphery of the plenum chamber. The wall and connector member are formed from compressed laminae of glass fibers impregnated with phenolic binders to provide a lightweight, thermally insulating, sound absorbing plenum chamber. The connector member can have a plurality of centric surface indentations to permit a selective formation of an appropriately dimensioned aperture for interconnection with a duct of an air delivery system. The plenum chamber has been optimally designed to provide a variable density across its width with a tightly packed exterior surface and a loosely packed fibrous interior surface to improve the sound absorption characteristics.

The process of manufacturing the plenum chamber to provide these highly desirable features includes placing a plurality of fiberglass laminae having uncured plastic binders into a mold cavity of the desired shape. The fiberglass laminae are then compressed to provide differential degrees of density and are heated to cure the plastic binder. The fiberglass sheets can be heated to a temperature range of approximately 700° F. to 900° F. for a period of time of approximately 25 to 45 seconds. These optimum ranges can be varied since a curing cycle includes a heat/time/thickness relationship. An intermediate sheet for example of paper or aluminum can be sandwiched between the glass fiber sheets to assist in sealing the plenum chamber from air leakage. Since the plenum chamber is made from a fiberglass insulation material the use of metal is eliminated and improved thermal insulation characteristics is obtained. The fiberglass plenum is designed to give maximum sound absorption for the air passing through the plenum chamber and has a specially designed interior surface to assist in this effect.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 3 is a schematic cross-sectional view of the compression process of manufacturing the plenum chamber of the present invention;

FIG. 4 is a cross-sectional view of a plenum chamber operatively mounted in a ceiling, and FIG. 5 is a partial cross-sectional view of the connecting member of the plenum chamber.

DESCRIPTION OF THE PREFERRED EMBODIMENT

The following specification taken in conjunction with the drawings sets forth the apparatus and process steps of the present invention in such a manner that any person skilled in this art can utilize the invention. The embodiment of the invention disclosed herein, is the best mode contemplated by the inventor of carrying out his invention in a commercial environment, although it should be understood that various modifications can be accomplished within the parameters of the invention.

Figure 1:
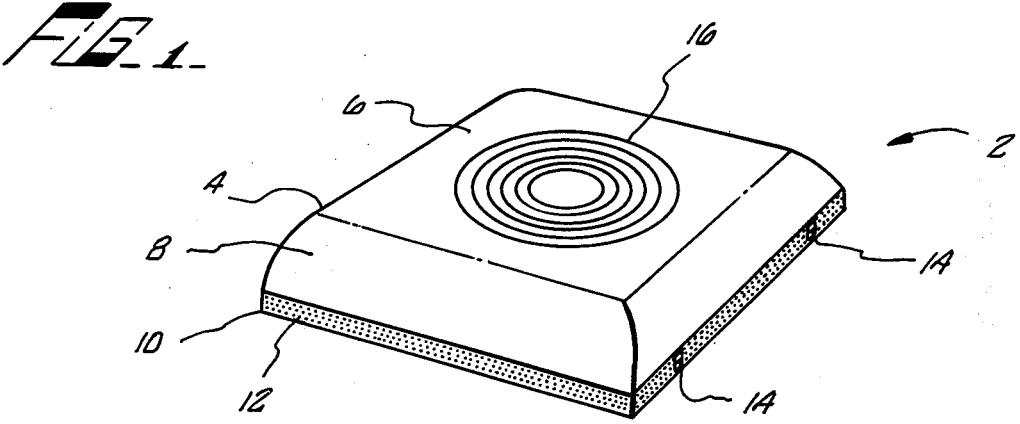
FIG. 1 is a perspective side view of a universal diffuser assembly of the present invention.

Referring to FIG. 1, a perspective view of a universal diffuser assembly 2 of the present invention is disclosed. The diffuser assembly 2 includes a fiberglass plenum chamber 4 having a planar connector member 6 and curvilinear walls 8 to provide an approximately concave shape to the interior of the plenum chamber 4. The peripheral edge of the plenum chamber 4 is appropriately connected to a perforated faceplate 10. The perforated faceplate 10 can be formed from a sheet of metal having a plurality of small circular holes with the edges of the plate extending upward at a 90° angle to provide a mounting flange 12 about the periphery of the faceplate 10. Appropriate fasteners or connectors 14 which can include nuts and bolts, clips, plastic studs, etc., are provided for fastening the plenum chamber 4 through appropriate holes in a dense section of the wall to the perforated faceplate 10.

The universal diffuser assembly 2 shown in FIG. 1 is designed for a tee bar lay-in ceiling utilizing ceiling panels of a two by two foot size. As can be appreciated, the fiberglass plenum chamber 4 of the present invention could be combined with other conventional forms of diffuser parts within the scope of the present invention for other types of installation and accordingly the preferred embodiment disclosed herein as the best mode of the present invention should not be construed in a limiting manner.

The exterior surface of the connector member 6 has a plurality of concentric surface indicia to permit the installer to selectively form an appropriately dimensioned aperture on the connector member 6 for interconnection with a duct of an air delivery system. In the preferred embodiment, the surface indicia are indented circular patterns 16 molded into the exterior of the connector member 6. The installer can simply cut, for example, with a knife or scissors a circular aperture in the connector member 6 at the job site to simplify the installation of the diffuser assembly to a duct system. Thus, the installer need not utilize any transition adaptor collars as required with conventional diffuser assemblies.

Referring to FIG. 4, means for controlling the directional flow pattern of the air through the faceplate 10 such as an air deflector assembly or air pattern control grid 18 can be mounted directly on the interior surface of the perforated faceplate 10. These air pattern control grids 18 are standard in the industry and various other configurations and types could be utilized to achieve the same result. While not shown, a damper assembly could also be included and it would be possible to make provisions for spring loaded dampers, registers mounting clips or springs for any subjective installation requirement. For the purpose of the present invention, it is not necessary to show these features since they are well-known in the prior art.

As can be seen in FIG. 4, a tee bar rail 20 can adequately support the diffuser assembly 2 as well as the conventional ceiling acoustical tiles 22. While the diffuser assembly 2 of the present invention is shown in a conventional mounting arrangement for a false ceiling, it should be realized that a vertical mounting in an appropriate circumstance is also possible and that other configurations and shapes of the plenum chamber and diffuser assembly are easily possible within the teachings of the present invention. The air duct 44 is mounted on the plenum chamber 4 with spring clips 46, after the installer has cut and removed an appropriate portion of the connecting member 6.

Referring to FIG. 5, a cross-sectional segment of the connector member 6 is shown. As can be seen, the exterior surface 24 is relatively densely packed and has a smooth finish compared to the loose fiber textured interior surface 26. It is believed that the provision of this textured fibrous surface throughout most of the interior of the plenum chamber 4 assists in reducing the noise criteria number, NC, to provide an improved sound absorption performance over that of an equivalent metal plenum chamber diffuser assembly.

Figure 2:
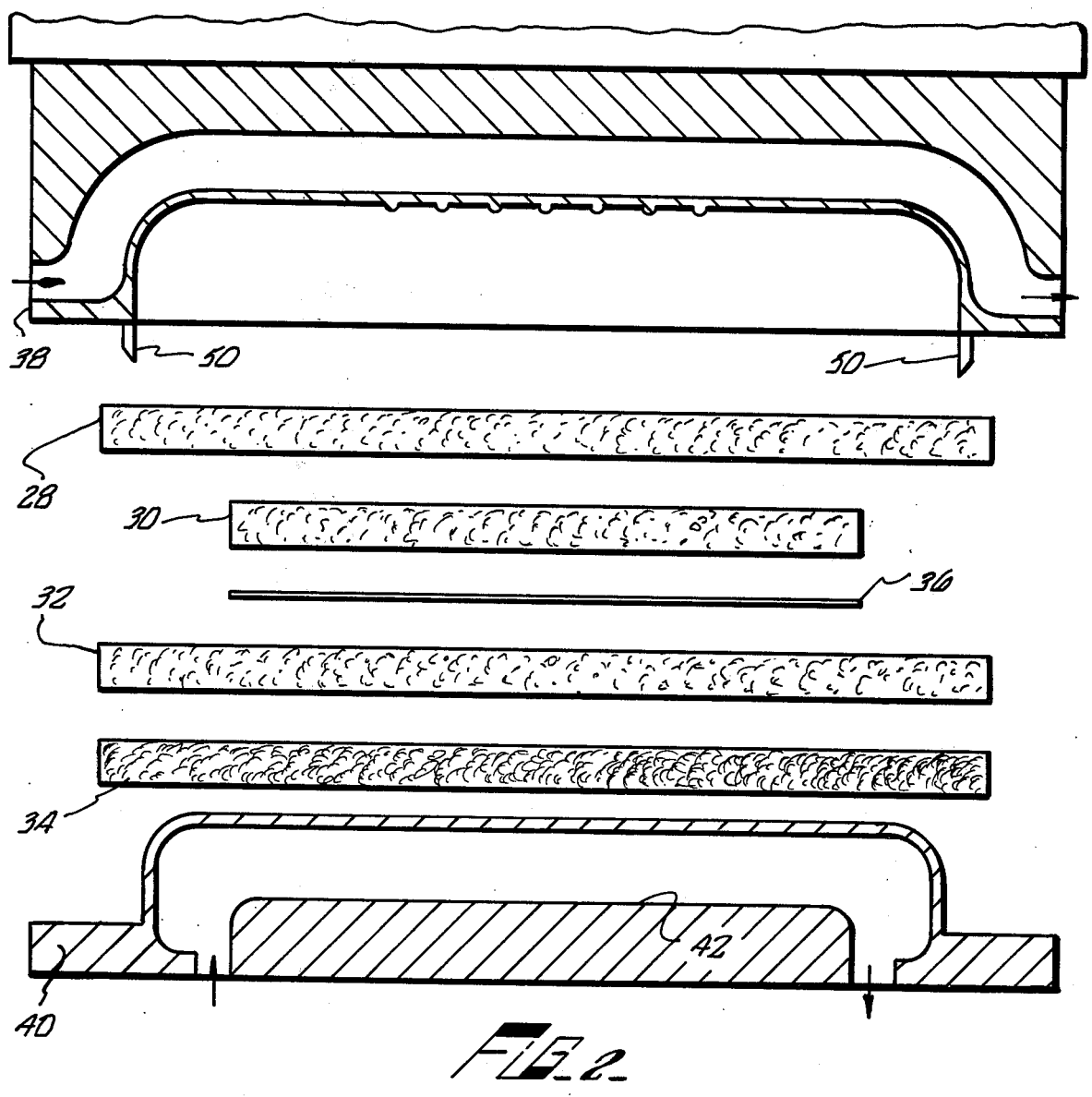
FIG. 2 is a schematic of charging a mold for the manufacturing process of the present invention.

As can also be seen in FIGS. 2 and 5, four fiberglass laminae or sheets form the planar connector member 6. Each of the respective glass fiber layers 28 through 34 can comprise a one inch layer of fibrous glass bonded together with an uncured or partially cured "B" stage thermosetting phenolic resin binder with an initial density of three-quarters pound to one pound per cubic feet. Approximately 15 percent by weight of the sheet comprises the phenolic resin binder while 85 percent comprises fibrous glass generally having a fiber diameter range of 0.00032 to 0.00040 inches. This material can be commercially purchased from Certainteed St. Gobain of Valley Forge, Pennsylvania. Since this material is commercially available it is not believed necessary to describe the particular phenolic binders utilized. The fiberglass sheets are usually sold in a cured condition as fiberglass duct wrap as described in a Pittsburgh Plate Glass Industries Bulletin F-601B but can be purchased uncured with carbon black pre-mixed.

To assist in rendering the plenum chamber airtight an intermediate non-fiberglass sheet such as conventional Kraft paper or a layer of aluminum foil can be sandwiched in the connector member 6 of the plenum chamber 4. Carbon or lamp black can be added to the fiberglass layer 34 to provide a black coloration to the interior of the plenum chamber thereby improving the esthetic appearance by not distracting from the color of the ceiling tile. Further it is believed that this carbon black acts as an inert filler or retardant agent which prevents the densely packing of the glass fibers on the interior surface by physical separation of fibers and resin and thereby provides the fibrous textured surface disclosed in FIG. 5. Other inert fillers could be used to achieve the same effect.

As can be seen from FIG. 2, the intermediate layer 36 does not extend into the peripheral edge portion of the curvilinear wall 8. This insures adequate adhesion between the three fiberglass layers to provide a relatively dense, twelve pounds per cubic feet, edge portion to assist in both supporting the weight of the plenum chamber and to strengthen the mounting of the perforated faceplate 10.

During manufacturing, fiberglass layers 28, 32 and 34 are cut to an appropriate identical size while fiberglass layer 30 and the intermediate layer 36 are cut to a smaller size and are concentrically mounted in the mold cavity between the top mold die set 38 and the lower die punch assembly 40. The mold walls can be formed of one-fourth inch steel and are only shown schematically in FIGS. 2 and 3. A peripheral knife edge member 50 can cut any excessive fiberglass laminae extending beyond the mold cavity. The top mold 38 and die punch assembly 40 includes manifolds 42 for receiving heated air to provide the curing temperature. Cooling means such as heat exchange water conduits (not shown) can also be utilized to maintain accurate alignment of the mold platens with a convention tie rod assembly (not shown). The tie rod assembly can be connected to either a mechanical or a hydraulic source of power for forcing the top and bottom together under a force of approximately ten tons to form the desired thickness configuration of the plenum chamber.

The compressed fiberglass laminae are subject to a pressure of approximately 2.5 tons per square foot and to a temperature range of approximately 700 F. to 900

F. for a period of time of approximately 25 to 45 seconds. These parameters apply for the particular thickness of fiberglass layers disclosed to produce a resultant plenum chamber having a thickness, t, of one-sixteenth inch on its outer edge to as much as three-eights inch thickness, T, across the connector member 6. Obviously other temperature ranges and time periods can be derived from these values for different thicknesses of fiberglass layers.

FIG. 3 shows a cross-sectional view of the fiberglass layers compressed together and cured to provide a semi-rigid configuration for the plenum chamber 4. As can be seen, the peripheral edge is compressed to a maximum extent to provide a density of roughly twelve pounds per cubic feet. Thereby providing maximum structural strength. In this region of the plenum chamber, the prime design consideration is strength since thermal insulation is not too significant since the acoustical ceiling tiles border the edges adjacent the tee bar support rail and further sound absorption capability would not contribute to the performance of the plenum chamber since the air pattern control grid 18 has already directed the flow pattern of the air. The curvilinear section 8 between this flat peripheral edge and the flat connector member 6 requires structural strength because they must support the air-conditioning duct 44 that has been attached to the plenum chamber with a spring snap 46. Additionally, thermal insulation and sound absorption characteristics are important. The planar connector member 6 has the thickest wall section and is approximately one quarter to three-eighths of an inch compared to the one-sixteenth inch thickness of the peripheral edge. While structural strength is also required to a lesser degree than the curvilinear section, the thermal insulation characteristics and the sound absorption characteristics are extremely important. For this reason, the extra layer of fiberglass 30 is utilized on this portion of the plenum chamber 4. The relative ratio of the thickness of the adjacent faceplate edge of the peripheral wall to the thickness of the connector member 6 is approximately 1 to 6. The relative ratio of the corresponding densities is approximately 4 to 1 with the density of the connector member 6 being $3.7\#/ft^3$.

The resultant universal diffuser assembly 2 has been found to have a noise criteria, NC, number of significantly less value than that of a normal sheet metal diffuser assembly of the same faceplate area. The noise criteria numbers are derived from a standardized procedure that is related to the magnitude of noise of sound generating devices. These numbers are obtained from plotting various sound levels on a predetermined curve. The resultant single number, NC, is the maximum point that the plotted curve reaches relative to the predetermined curves. The purpose of utilizing NC numbers as a design tool are based on physiological studies of human perception of sounds in a communicative environment relative to background sounds. These studies found that people could perceive the same noise of for example, one quantitative sound level at one frequency while they would perceive a different quantitative sound level at a different frequency. That is, 60DB at 125 cycles per second is approximately the same perceptive sound as 44DB at 2,000 cycles per second. In deriving the NC values, the room in which the diffuser is mounted is assumed to have a room absorption of 8DB, $RE10^{-12}$ watts and sound levels are taken at eight different frequencies, i.e., between 50 and 10,000. The resultant NC curve is a series of curves constructed to be approximately representative of the loudness contours in speech interfering properties of noise. For example, an NC number 30 would be considered quiet for an air-conditioning diffuser assembly while an NC number of 50 would be considered noisy and only resorted to when it is necessary to deliver a large quantity of air to a restricted space. The following chart discloses the sound absorption performance measured by the NC number for various inlet sizes and cubic feet per minute air flow;

| INLET SIZE | | INLET VELOCITY (F.P.M.) & VELOCITY PRESSURE (IN. H₂O) | | | | | | | | | | | | | | |
|---|---|---|---|---|---|---|---|---|---|---|---|---|---|---|---|---|
| | | 300 | .006 | 400 | .010 | 500 | .016 | 600 | .023 | 700 | .031 | 800 | .040 | 1000 | .063 | 1200 | .090 |
| 5" | CFM | 40 | | 55 | | 70 | | 80 | | 95 | | 110 | | 135 | | 165 |
| | Pt | .009 | | .015 | | .023 | | .033 | | .045 | | .059 | | .092 | | .132 |
| | NC | — | | — | | — | | 16 | | 21 | | 25 | | 31 | | 36 |
| 6" | CFM | 60 | | 80 | | 100 | | 120 | | 140 | | 160 | | 200 | | 235 |
| | Pt | .009 | | .016 | | .025 | | .036 | | .049 | | .074 | | .100 | | .144 |
| | NC | — | | — | | — | | 18 | | 23 | | 27 | | 34 | | 38 |
| 7" | CFM | 80 | | 105 | | 135 | | 160 | | 190 | | 215 | | 270 | | 320 |
| | Pt | .009 | | .017 | | .026 | | .038 | | .051 | | .067 | | .105 | | .151 |
| | NC | — | | — | | 16 | | 20 | | 25 | | 29 | | 35 | | 40 |
| 8" | CFM | 105 | | 140 | | 175 | | 210 | | 245 | | 280 | | 350 | | 420 |
| | Pt | .010 | | .017 | | .027 | | .039 | | .052 | | .068 | | .107 | | .154 |
| | NC | — | | — | | 17 | | 22 | | 26 | | 30 | | 37 | | 42 |
| 9" | CFM | 135 | | 175 | | 220 | | 265 | | 310 | | 355 | | 440 | | 530 |
| | Pt | .011 | | .019 | | .029 | | .042 | | .057 | | .075 | | .117 | | .168 |
| | NC | — | | — | | 20 | | 25 | | 29 | | 33 | | 39 | | 44 |
| 10" | CFM | 165 | | 220 | | 270 | | 325 | | 380 | | 435 | | 545 | | 655 |
| | Pt | .012 | | .020 | | .032 | | .046 | | .063 | | .082 | | .128 | | .184 |
| | NC | — | | 16 | | 22 | | 27 | | 31 | | 35 | | 42 | | 46 |
| 12" | CFM | 235 | | 15 | | 390 | | 470 | | 550 | | 630 | | 785 | | 945 |
| | Pt | .015 | | .028 | | .042 | | .060 | | .082 | | .108 | | .168 | | .242 |
| | NC | — | | 18 | | 25 | | 30 | | 35 | | 39 | | 45 | | 50 |
| 14" | CFM | 320 | | 25 | | 530 | | 635 | | 740 | | 850 | | 1060 | | 1270 |
| | Pt | .021 | | .038 | | .059 | | .085 | | .115 | | .151 | | .236 | | .340 |
| | NC | 16 | | 24 | | 30 | | 35 | | 40 | | 44 | | 50 | | 55 |
| 16" | CFM | 420 | | 560 | | 700 | | 840 | | 980 | | 1120 | | 1400 | | 1680 |
| | Pt | .026 | | .046 | | .072 | | .104 | | .142 | | .186 | | .290 | | .418 |
| | NC | 19 | | 27 | | 34 | | 39 | | 43 | | 47 | | 53 | | 59 |

As can be seen from the above chart, the plenum chamber of the present invention provides a relatively quiet diffuser assembly for most applications. The term, NC, refers to the noise criteria while, Pt, refers to the total pressure drop in inches of water. All data provided is for a four-way throw with terminal velocities of 150, 100 and 50 F.P.M. being sustained using isothermal air.

While the preferred embodiment of the present invention is disclosed in the specification and drawings, it should be realized that once given the teachings of the present invention, the various modifications would be possible to a person of ordinary skill in this art, and accordingly the metes and bounds of the present invention should be measured solely from the following claims.

What is claimed is:

1. In a diffuser assembly for connection to an air delivery system the improvement comprising;
   a plenum chamber having a base connector member and an outwardly extending wall defining an approximately concave configuration, the wall and connector member formed from molded glass fibers and plastic binders to provide a cross-sectional configuration having an interior fibrous textured surface and a comparatively more densely fibrous packed exterior housing surface to provide a lightweight sound absorbing diffuser assembly, the total density of the base connector member being less than the total density of the wall whereby the wall is provided with greater structural strength while the base connector member has greater insulation and sound absorbing capabilities, and
   means for connecting the plenum chamber to the air delivery system.

2. The invention of claim 1 wherein the molded glass fibers and uncured plastic binders are compacted in an appropriately shaped mold and are cured at approximately temperatures representative of temperatures of 700° F. to 900° F. for a time period of approximately 25 to 45 seconds for a connector member thickness of approximately one-fourth inch to provide the interior fibrous textured surface.

3. The invention of claim 2 wherein carbon black is mixed with the uncured plastic binder on the interior surface before curing.

4. The invention of claim 3 wherein a plurality of layers of fiberglass and uncured phenolic binders are compression molded together under a pressure of approximately 2.5 tons per square foot.

5. The invention of claim 4 wherein an intermediate sheet of non-curable material is positioned between at least two layers of fiberglass and uncured phenolic binders.

6. The invention of claim 4 wherein the base connector member has a plurality of indented concentric configurations to permit the diffuser assembly to be universally adaptable to various duct sizes by removing a selected concentric configuration compatible with the interfacing duct.

7. The invention of claim 1 wherein the interior fibrous textured surface includes an inert filler to provide fibrous glass fibers extending freely from the interior surface.

8. The invention of claim 1 wherein an intermediate sheet is positioned between at least two layers of fiberglass and plastic binders to reduce any porosity of the plenum chamber and the plenum chamber consists of only the glass fibers plastic binder and intermediate sheet.

9. A diffuser assembly for connection to an air delivery system with ducts comprising;
   a plenum chamber member including a base connector and a wall extending from the base connector to define the plenum chamber cavity, the wall and base connector integrally formed from compressed laminae of glass fibers and plastic binders to provide a lightweight, thermal insulating, sound absorbing plenum chamber member having an interior fibrous textured surface and a comparatively more densely packed fibrous exterior laminae surface, further the total density of at least a portion of the wall being greater than the total density of the base connector member to provide structural strength to the plenum chamber member while the less dense base connector increases the sound absorbing capabilities;
   means for forming an aperture in the base connector for interconnection with a duct of the air delivery system;
   a perforated faceplate connected to the plenum chamber member to close at least a portion of the plenum chamber cavity and
   means for controlling the directional flow pattern of air through the faceplate.

10. The invention of claim 9 wherein the means for forming an aperture includes a plurality of concentric surface indicia in the base connector to permit a selective formation of an appropriately dimensioned aperture for interconnection with a duct of the air delivery system.

11. The invention of claim 10 wherein the surface indicia are indented circular patterns molded in the base connector surface.

12. The invention of claim 9 further including a non-fiberglass sheet sandwiched between at least a pair of glass fiber and plastic binder laminae to assist in sealing the plenum chamber.

13. The invention of claim 12 wherein the non-fiberglass sheet is formed of paper.

14. The invention of claim 12 wherein the non-fiberglass sheet is formed of metal.

15. The invention of claim 12 wherein the metal sheet is a thin sheet of aluminum.

16. The invention of claim 9 wherein the relative ratio of the thickness of the plenum chamber member wall adjacent the faceplate to the thickness of the base connector is approximately 1 to 6.

17. The invention of claim 9 wherein the relative ratio of the density of the plenum chamber member wall adjacent the faceplate to the density of the base connector is approximately 4 to 1.

18. The invention of claim 9 wherein the density of the plenum chamber member wall adjacent the faceplate is approximately twelve pounds per cubic foot.

19. The invention of claim 9 wherein the laminae comprises approximately 15 percent phenolic binder and 85 percent fibrous glass.

20. The invention of claim 9 wherein the wall and base connector interior surfaces include carbon black.

21. The invention of claim 9 having a noise criteria, NC, characteristic value less than an equivalent two foot by two foot metal diffuser assembly in the range of 16 to 46 for a ten inch inlet duct having inlet velocities from 400 feet per minute with a velocity pressure of 0.01 inch of water at NC=16 to 1200 feet per minute with a velocity pressure of 0.09 inches of water at NC=46 based on a room absorption of 8DB, RE $10^{-12}$ watts.

22. A diffuser assembly for connection to an air delivery system with ducts comprising;

a plenum chamber member including a base connector and a wall extending from the base connector to define the plenum chamber cavity, the wall and base connector integrally molded from compressed laminae of approximately 15 percent phenolic binder and 85 percent fibrous glass, the plenum chamber member having an interior fibrous textured surface and a comparatively more dense fibrous exterior laminae surface, the laminae of the base connector being compressed to a density of approximately 3.7 pounds per cubic foot and the laminae of a peripheral edge of the wall being compressed to a density of approximately twelve pounds per cubic foot;

means for forming an aperture in the base connector for interconnection with a duct of the air delivery system, and a perforated faceplate connected to the plenum chamber member to close at least a portion of the plenum chamber cavity.

23. The invention of claim 22 wherein the means for forming an aperture includes a plurality of indented concentric configurations to permit the diffuser assembly to be universally adaptable to various duct sizes by removing a selected concentric configuration compatible with the interfacing duct.

24. The invention of claim 22 wherein carbon black is mixed with the uncured plastic binder on the interior surface before curing to provide fibrous glass members extending freely from the interior surface.

25. The invention of claim 24 wherein an intermediate sheet of non-curable material is positioned between at least two layers of fiberglass and uncured phenolic binders.

* * * * *